United States Patent
Watts, Jr.

(10) Patent No.: US 6,816,925 B2
(45) Date of Patent: Nov. 9, 2004

(54) COMBINATION PERSONAL DATA ASSISTANT AND PERSONAL COMPUTING DEVICE WITH MASTER SLAVE INPUT OUTPUT

(75) Inventor: La Vaughn F. Watts, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 09/770,138

(22) Filed: Jan. 26, 2001

(65) Prior Publication Data

US 2002/0103949 A1 Aug. 1, 2002

(51) Int. Cl.[7] .............................................. G06F 13/10
(52) U.S. Cl. .......................... 710/36; 710/38; 710/62; 710/72; 710/110; 710/316
(58) Field of Search .......................... 710/2, 8, 14, 36, 710/38, 62–64, 72–74, 300, 301, 305, 306, 313–316, 107, 110

(56) References Cited

U.S. PATENT DOCUMENTS

| | | | | |
|---|---|---|---|---|
| 4,484,306 A | * | 11/1984 | Kulczyckyj et al. | ........ 713/202 |
| 5,590,338 A | | 12/1996 | Parks et al. | .................. 395/742 |
| 5,608,884 A | | 3/1997 | Potter | .......................... 395/309 |
| 5,742,794 A | | 4/1998 | Potter | .......................... 395/500 |
| 5,774,637 A | * | 6/1998 | Haber et al. | ................ 358/1.15 |
| 5,809,262 A | | 9/1998 | Potter | .......................... 395/309 |
| 6,101,562 A | * | 8/2000 | Chang et al. | .................. 710/73 |
| 6,473,789 B1 | * | 10/2002 | Chen et al. | .................. 709/213 |
| 6,538,880 B1 | * | 3/2003 | Kamijo et al. | .............. 361/686 |
| 6,574,115 B2 | * | 6/2003 | Asano et al. | ................ 361/775 |
| 6,578,140 B1 | * | 6/2003 | Policard | ........................ 713/1 |
| 2002/0099899 A1 | * | 7/2002 | Shaw | .......................... 710/316 |
| 2002/0137472 A1 | * | 9/2002 | Quinn et al. | .................. 455/90 |
| 2003/0188077 A1 | * | 10/2003 | Watts et al. | ................. 710/313 |

FOREIGN PATENT DOCUMENTS

EP        0 703 522 A2  *  3/1996

* cited by examiner

Primary Examiner—Ilwoo Park
(74) Attorney, Agent, or Firm—Haynes and Boone, LLP

(57) ABSTRACT

In order to provide continuous communication ability in a computer architecture that integrates a computer (PC) architecture system and a personal digital assistant (PDA) architecture system, a common communication device is provided. Independent access is made available to the communication device to either the PC or the PDA depending on which system is in control. A switch isolates either the PC or PDA to control of the communication device and other common peripherals. The PDA can be a slave device to the PC, with both systems synchronized with one another and able to exchange information and data. Because the PDA consumes much less power than the PC, the PDA can remain active while the PC is shut off. Because the PDA has the ability to communicate the computer continues to receive and transmit messages and information.

16 Claims, 5 Drawing Sheets

COMBINATION PERSONAL DATA ASSISTANT AND PERSONAL COMPUTING DEVICE WITH MASTER SLAVE INPUT OUTPUT

CROSS REFERENCE TO RELATED PATENT APPLICATIONS

This application is related to commonly assigned patent application Ser. No. 09/740,138, filed Dec. 18, 2000 and entitled "A COMBINATION PERSONAL DATA ASSISTANT AND PERSONAL COMPUTING DEVICE" having La Vaughn F. Watts, Jr. and Ronald D. Shaw as inventors.

BACKGROUND

This disclosure relates generally to a computing system and more particularly to a mobile computing system integrating dissimilar computing architectures and wireless communications that are accessible by any one of the systems.

There are currently two popular types of mobile computing systems; the mobile personal computer (PC) and the personal digital assistant (PDA). The mobile PC is a fully functional data processing system, typically having the same functionality as a desktop PC or a workstation PC. The mobile PC typically is known as a "notebook" or "laptop" computer. The mobile PC type runs under any number of operating systems (OS), such as one of the releases of Windows® by the Microsoft Corporation. In implementing the mobile PC in a mobile computing system, several relatively undesirable features are apparent. The batteries of the portable mobile PC device must be recharged after a relatively short time, typically, in the order of a few hours. Despite improvements in battery technology, the quest for lighter and more compact portable units have tended to reduce the space allocated to the batteries so that time between charging of the batteries has not been significantly improved. The batteries used in the portable mobile PC devices, however, are capable of relatively rapid charging. As with the desktop PC unit and the workstation PC from which they are derived, the operating system needed for the mobile PC requires a relatively long time from the activation of the power switch to the time when the processing system is available for actual computation. The mobile PC, however, has remarkable flexibility and can provide processing capability of extraordinary power.

More recently the PDA system has been developed to take advantage of operating systems (OS) such as Palm® OS and Windows® CE. These operating systems, in conjunction with a PDA system, permit a reduced or specialized functionality computing system.

Typically, these PDAs are relatively small and can perform a variety of useful functions such as arrange calendars; schedule appointments; send and receive e-mail; provide presentations; create documents; and provide communications. The PDA OS can permit exchange of files between the PDA systems and a mobile PC with Microsoft Windows® files. While the reduced functionality can be a disadvantage of the PDA, the PDA has several advantages over the mobile PC. An advantage is the time between charging of the batteries can be greatly extended, a result of the reduced functionality and the absence of disk storage units. A PDA has considerable flexibility with respect to expansion. Another advantage is the PDA has its memory loaded in a memory circuit, such as a flash memory, as contrasted with a disk drive for the mobile PC devices. Activation for a PDA is much quicker than a mobile PC. The PDA can be fully functional from the time that it is activated.

Wireless communications have allowed mobile PCs and PDAs to send and receive email; connect to the internet; communicate with other computers; and interface with other devices. Wireless communications categories are wireless wide area network (WWAN) that includes cellular communications; wireless local area networks (WLAN) that includes Institute of Electrical and Electronics Engineers (IEEE) standards 802.11a and 802.11b; and the evolving category of wireless personal area networks (WPAN) that includes evolving "Bluetooth" technology. WWAN includes communicating to distant computers commonly by a cellular connection. WLAN includes communicating to nearby computers or peripheral devices. WPAN is an evolving category, with particular focus on an industry sponsored standard known as "Bluetooth." WPAN involves a "travelling" communication space around the notebook. The space is analogous to a "bubble" that surrounds and follows the notebook. As the notebook WPAN "bubble" overlaps with technology that recognizes the WPAN technology a communication link is established. For example, in terms of "Bluetooth" technology, a "Bluetooth" equipped notebook would be able to communicate with a "Bluetooth" equipped telephone, allowing the notebook to place and receive calls from the telephone.

Businesses and groups with a number of computers have information technology (IT) specialists that provide technical support to computers including notebooks. It is now common for an IT specialist to be able to access via a WWAN link to a notebook. The IT specialist is able to track the computer and assist a user if there is a problem with the notebooks. PDAs and cellular phones currently do not receive the same type of IT support as notebooks. It would be desirable to have a mobile computing unit that can remain continuously powered on, have a long life battery, consume minimal power, and be accessible at any given moment.

A master and slave computer architecture can be used for the PC and PDA mobile system. The PC system would be treated as a master device and the PDA as a slave. The PC system architecture makes use of a serial port or COM 1, 2, 3, or 4 (legacy device). The PC system communicates on a bus to one of these devices through the serial port. Specific addresses address COM 1, 2, 3, or 4. In a mobile system the PDA OS or the PDA architecture can look like a legacy device (slave) to the PC system (master). In PC systems using an Intel® x86 type processor, a communication protocol is used in this legacy device configuration. Typical applications of the legacy device include interfacing to a network interface card (NIC) on a bus and addressing that particular NIC by a set address.

PC systems have the computing capability and memory to handle all of the communications in a dual PC and PDA computer architecture. The PDA would be dependant on the PC system for any wireless information that may sent or received, since the PC would have to handle all communications. If communication is to take place, the PC system would have to be powered and ready. Current PDA systems are capable of sending email and other communication data and information, however, if a PDA system depends upon a PC system for communication, the PDA can neither receive nor transmit if the PC system is inactive.

Data synchronization between the PC system and the PDA system would also be affected if the PC system handles all communication, with data synchronization depending on when the PC system was active. Data on the PC system synchronizes to the PDA system if an active communication link is established to the PC system. Synchronization depends on three events: synchronization to a device such as server which communicates to the mobile computing system; synchronization of the PC system; and synchronization of the PDA system.

Considering that communication technologies are typically low power technologies, meaning that relatively low energy is consumed, a PDA system with its low power consumption capabilities can readily support communication for a mobile computing system incorporating a PC system while the PC system is inactive. Current wireless technologies and landline technologies, or communication technologies general, are typically low power technology. Considering that the PDA system relies on low-power technology, a direct link to the PDA system can be made.

Typical communications can involve a network interface card (NIC), "Bluetooth" transceivers, LAN or wireless local area network devices, cellular or wireless wide area network transceivers.

A need has been felt for a mobile computing system having the desirable features of a mobile PC and a PDA, and allowing wireless communications to interface to either system. The mobile computing system would have the features of an expanded time between battery charges; would be available for performing user-directed processing functions as soon as the power is applied. The mobile computing system would be capable of performing processing functions available to the full-function PC system; and would have a low-power, reduced functionality mode of operation and an increased power, full functionality mode of operation. The mobile computing system would also allow seamless communications supporting WWAN, WLAN, and WPAN technologies.

SUMMARY

The aforementioned and other features are accomplished, according to the present disclosure, by providing a mobile computing system and method that includes a PC system and a PDA system which have independent access to a communication device such as a wireless technology device.

Communication connection can be provided wireless communication links made available either through the PDA or the PC system. Wireless communication links include WPAN, WLAN, and WWAN.

A switch can isolate control of the communication device either to the PC when it is active or to the PDA when the PC is inactive. The PDA may act as a slave device to the PC which acts a master. In this arrangement, the PDA is connected along a bus along with other peripheral devices such as a keyboard, mouse, and display, made available to the PC. A user can selectively choose which system, PC or PDA, to operate under and control to the common peripherals will be given either to the PC or PDA.

Because of the low power consumption of the PDA as compared to the PC, the PDA can remain continuously active to receive communication providing continual information to the mobile computing system. When the PC is active, it can resume or take over communication and data from the PDA can be transferred or synchronized to the PC.

The PDA can be placed on a card form factor such as a mini PCI card. In addition, the communication device can be integrated into the mini PCI card. This provides modularity and flexibility in designing for certain communication technology that may be desired for various computer architectures.

BRIEF DESCRIPTION OF THE DRAWINGS

The present disclosure may be better understood, and its numerous objects, features and advantages made apparent to those skilled in the art by referencing the accompanying drawings. The use of the same reference number throughout the figures designates a like or similar element.

Figure 1:
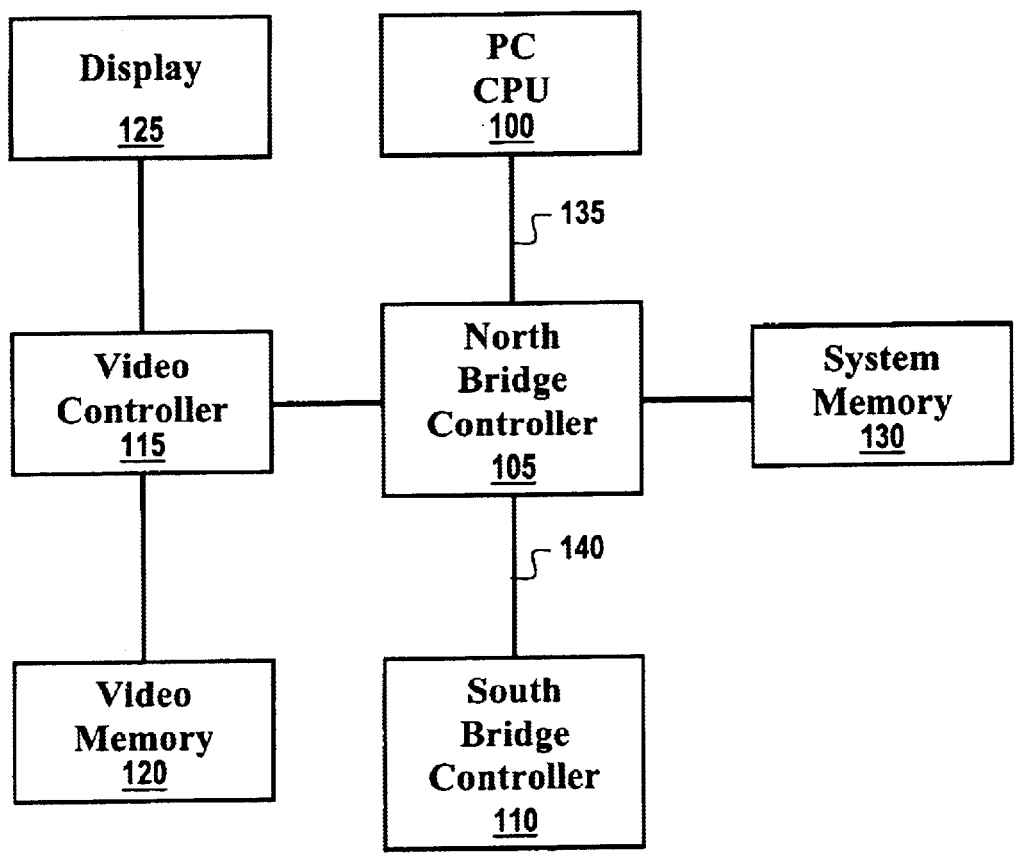
FIG. 1 illustrates a top-level block diagram of a PC system with a PDA system.

While the disclosure is susceptible to various modifications and alternative forms, specific embodiments thereof are shown by way of example in the drawings and will herein be described in detail, it should be understood, however, that the drawings and detailed description thereto are not intended to limit the disclosure to the particular form disclosed but on the contrary, the intention is to cover all modifications, equivalents, and alternatives falling within the spirit and scope of the present disclosure as defined by the appended claims.

DETAILED DESCRIPTION

Now referring to FIG. 1, illustrated is a PC architecture. The PC CPU 100 is connected to a north bridge controller 105 by a PCI bus 135. The north bridge controller 105 is connected to a south bridge controller 110 by a PCI bus 140. The north bridge controller 105 can interface to a video controller 115. The video controller 115 interfaces to a video memory 120 and a display 125. In a dual PC system and PDA system architecture, the display 125 is a common display to the PC system and the PDA system. The north bridge controller 105 interfaces to a system memory 130. The PCI bus structure allows for convenient expansion, in particular, expansion to other peripherals. Specifically, the south bridge controller 110 provides expansion to other peripherals. The peripherals can include I/O devices such as a keyboard, a mouse, or some other pointing device.

Figure 2:
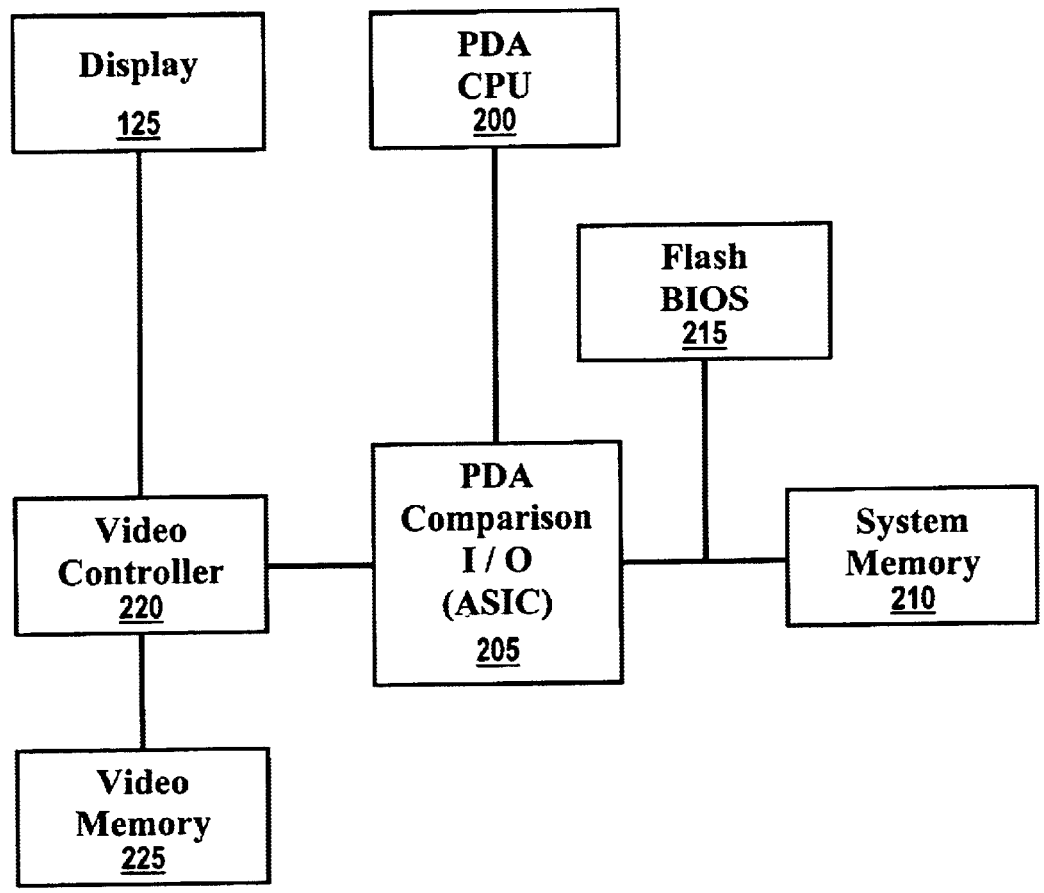
FIG. 2 illustrates a block the PC system and PDA system with wireless communication technology.

Now referring to FIG. 2 illustrated is a PDA architecture. A PDA CPU 200 interfaces to a PDA companion input output processor which is an applications specific integrated circuit (ASIC) 205. The ASIC 205 can interface to peripheral devices in a similar manner as the south bridge controller 110 of the PC architecture. The ASIC 205 interfaces to a flash basic input output system (BIOS) 215. The flash BIOS 215 and the ASIC 205 are connected to a system memory 210. ASIC 205 interfaces to a video controller 220. The video controller 220 interfaces to a video memory 225. The video controller 220 interfaces to the display 125. Display 125 is a common display for the dual PC system and PDA system architecture.

Figure 3:
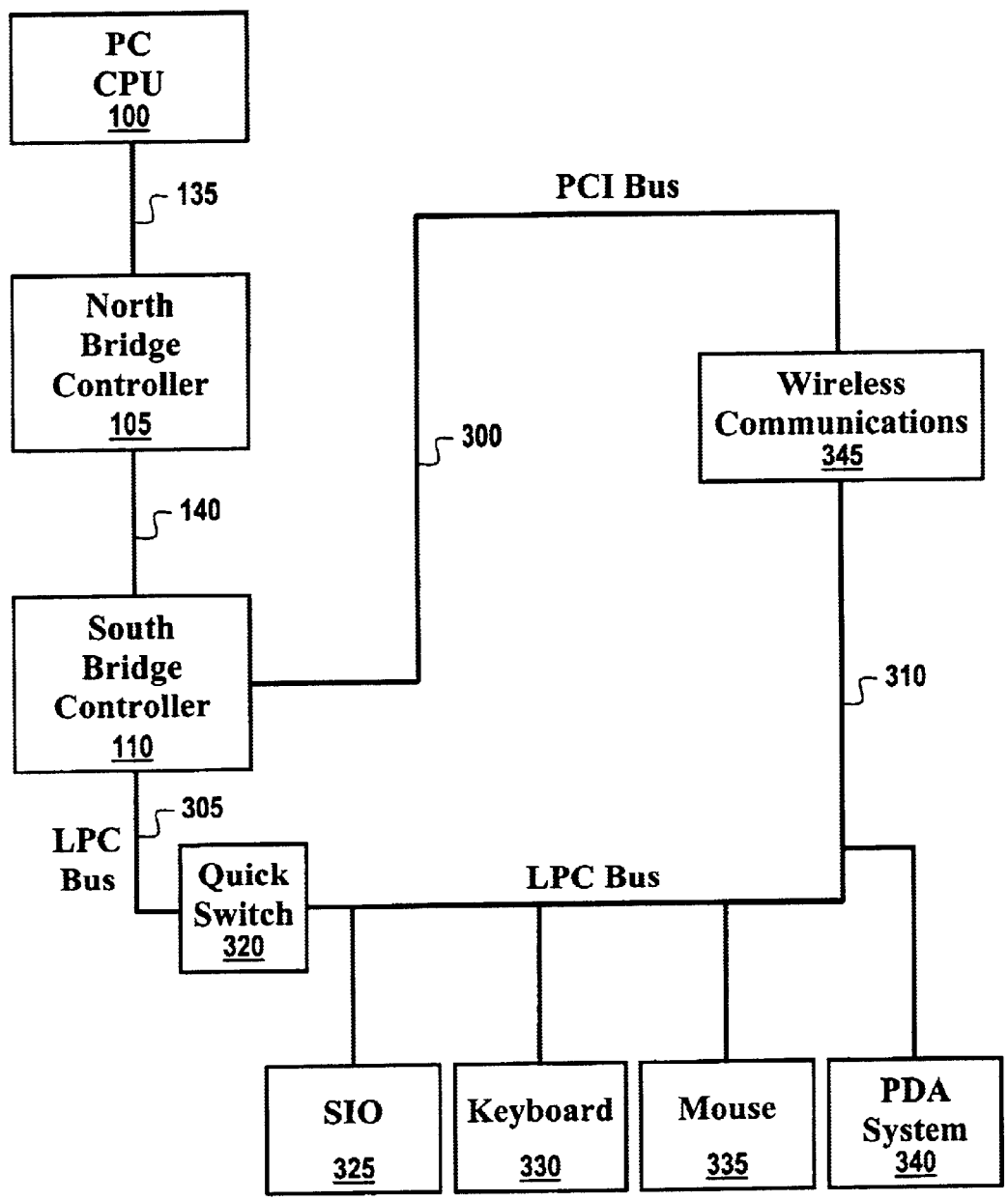
FIG. 3 illustrates an architecture that allows either a PC system or a PDA system to access wireless communication or communication cards.

Now referring to FIG. 3, illustrated is an architecture that allows either a PC system or a PDA system to access wireless communication or communication cards. The PC CPU 100 interfaces to the north bridge controller 105 by a PCI bus 135. The north bridge controller 140 interfaces to the south bridge controller 110 by a bus 140. From the south bridge controller 110 is a PCI bus 300. The PCI bus 300 connects the south bridge controller 110 to wireless communication device 345. Wireless communication device 345 can also be a NIC or other type of communication device for the computing system. The south bridge controller 110 connects to a LPC bus 305. The LPC bus 305 in turn connects, to a quick switch 320. From the quick switch 320 is a LPC bus 310. The LPC bus 310 interfaces to a super or serial input output controller (510) 325. Along the LPC bus 310 there are I/O devices such as a keyboard 330 and a mouse 335. The LPC bus 310 also connects the PDA system 340. In a particular embodiment the PDA system 340 interfaces to the quick switch 320 by way of the ASIC 205. In this architecture the PC system through the south bridge controller 110, and the PDA system 340 are able to interface to any type of communication device. As illustrated in FIG. 3, the communication device is the wireless communication device 345.

When the PC system is active, the PDA system 340 continuously has access to communications and interfaces to the wireless communication device 345. If the PC system is inactive, the PDA system 340 continuously receives information through the communication device 345, and allows messages such as email to be delivered to the mobile system as long as the PDA system is on. Since the PDA system consumes relatively low power, the PDA system 340 will continuously be on. With the PDA system 340 continuously on communication to the mobile system is maintained even when the PC system is inactive. By maintaining a communication link, an outside party such as information technology (IT) may monitor the mobile system checking its health and or configuration. In addition, if a cellular or WWAN device is attached to the architecture, IT can access that device as well. IT can look for a configuration information regarding the PDA, PC or any other communication device that is part of the architecture. For the PC PDA mobile system, one mode that is expected to be made available is an instant-on mode that allows the PDA system 340 to be activated prior to the PC system being activated. This means that as the PC system boots or loads up information, the PDA system 340 is already on. The PDA system being on means that instant communication, in particular wireless access is available. This also can provide instantaneous access to the application program such as a calendar, rolodex or other information the user may find critical or needed.

In this particular embodiment the PDA system 340 is connected along LPC bus 310 which connects the PC system. In this architecture the PDA system 340 is treated as a device which runs off of the PC system. Applications utilizing the PC system will see the PDA system 340 as a device that is dependent on the PC system. This particular architecture can be used in a legacy or a legacy-less system. In a legacy system the PDA system 340 is treated as a legacy-type device. In the legacy-less system the PDA system 340 can be connected to the legacy-less device in which the new programs will be written to. For this particular embodiment, it does not matter if the PDA system 340 or PC system is active for communication to take place. It is only important that one of the systems be active.

Figure 4:
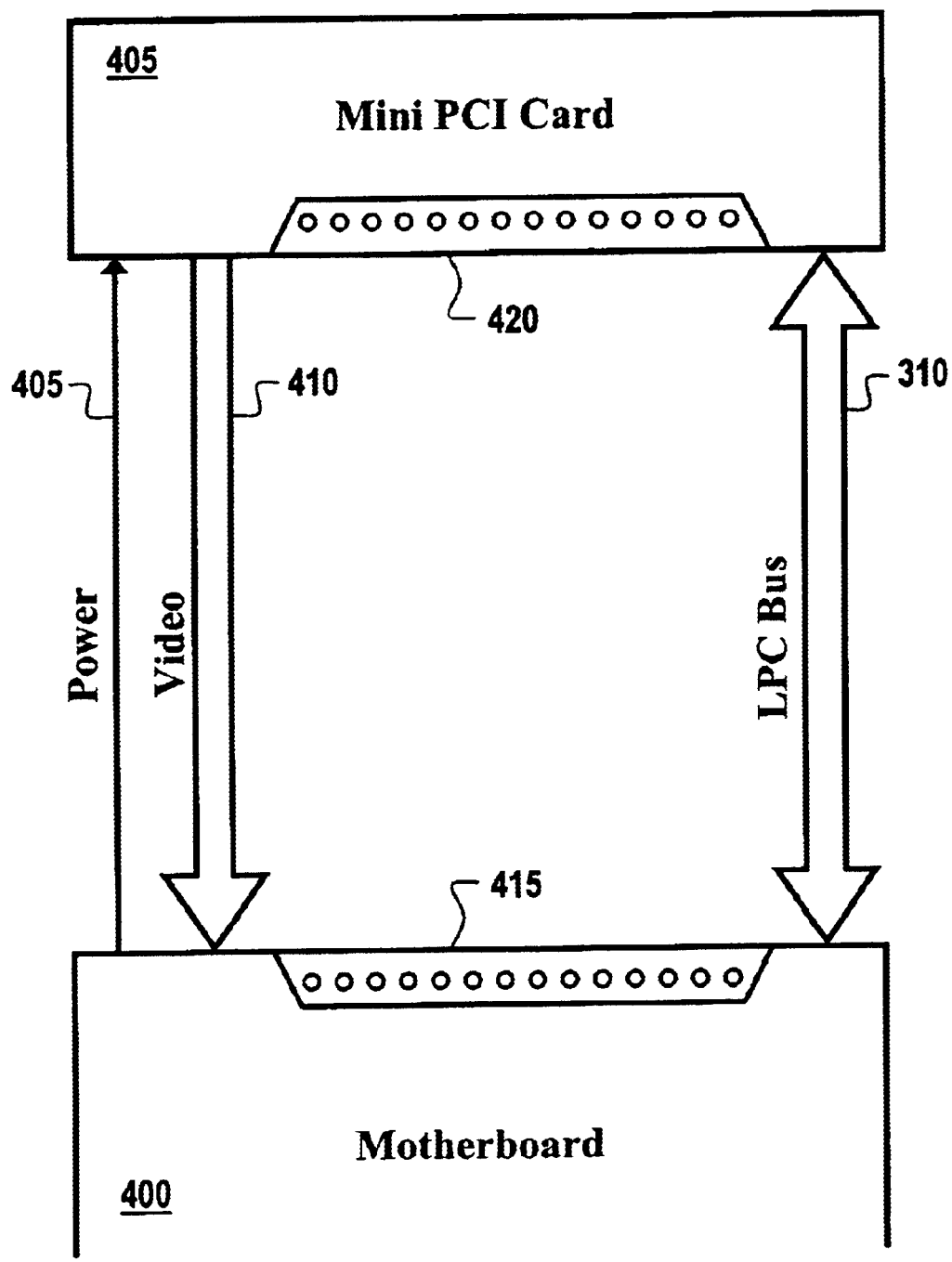
FIG. 4 illustrates a mini PCI card form factor.

Now referring to FIG. 4, illustrated is a form factor for the particular system architecture. To address the problems of integrating wireless solutions, and to integrate other "peripheral" applications into a notebook, manufacturers have looked to a standard form factor. To this end, the peripheral component interconnect special interest group (PCI SIG) developed the Mini PCI form factor. Mini PCI for wireless communications peripherals for notebooks offers several benefits over existing custom embedded solutions (motherboard or daughter card solutions) and PC cards. Based on the PCI bus interface, mini PCI is flexible and offers economies of scale especially when notebooks are "built to order." The mini PCI card is a small compact card specification, functionally equivalent to a standard PCI expansion card, with a standard 32-bit PCI local bus, standard PCI BIOS/driver interface, and standard input and output. Since the mini PCI form factor is based on the existing PCI bus used by the notebook, operating system applications will not be able to differentiate between a mini PCI card and a device located along a PCI bus.

In one particular embodiment, a mini PCI card 405, will be connected to a system motherboard 400. The connection is made through a PC connector 420 on the mini PCI card 405 to a mini PCI connector 415 located on the system motherboard 400. From the system motherboard a separate power line 405 is provided to the mini PCI card 405. Video signal 410 is provided back to the system motherboard 400 by the mini PCI card 405. Interconnecting the mini PCI card 405 and the system motherboard 400 is an LPC bus 310. The LPC bus 310 is a separate connection from the mini PCI connection provided in the standard mini PCI form factor.

Figure 5:
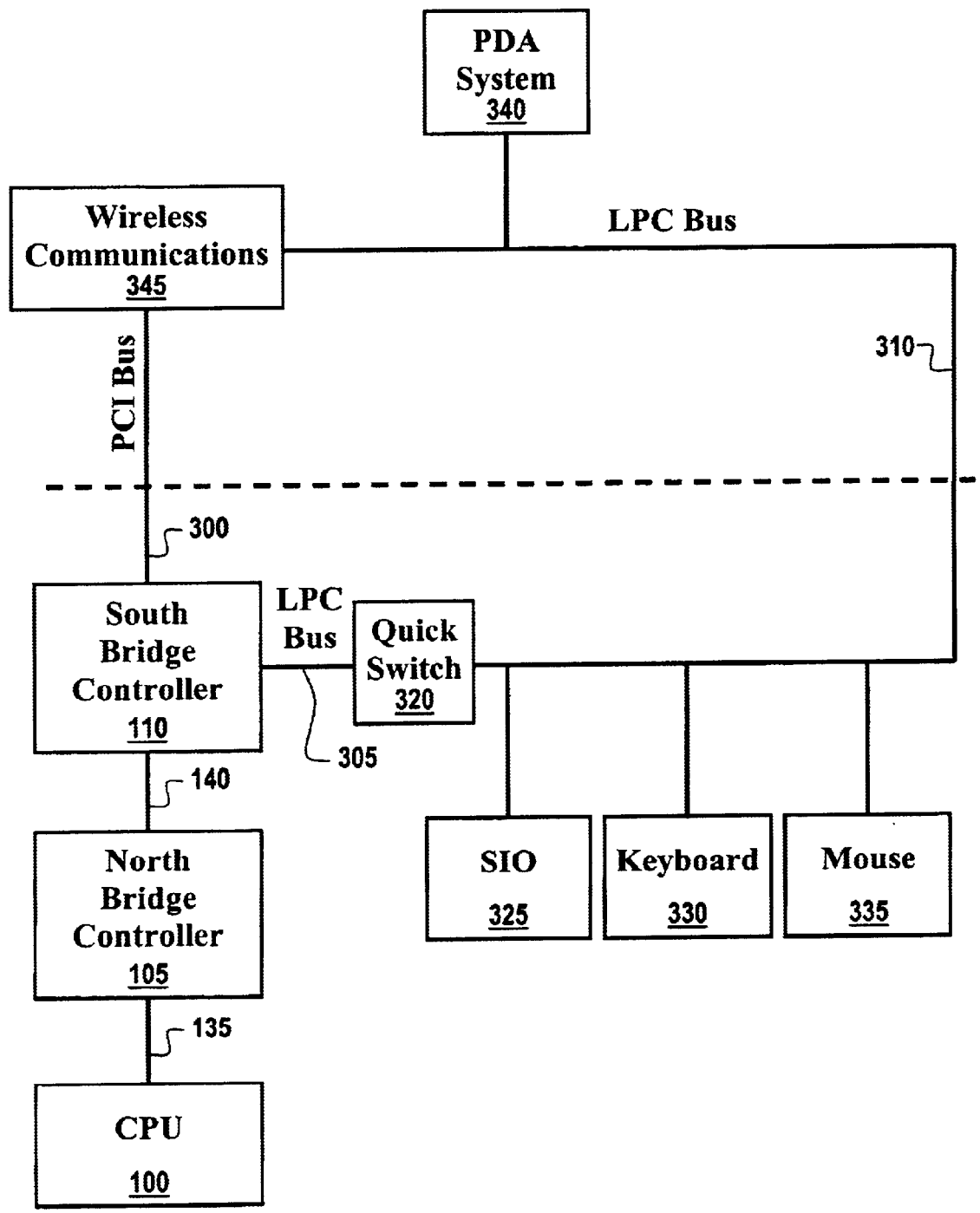
FIG. 5 illustrates a system architecture for the mini PCI card form factor.

Now referring to FIG. 5, illustrated is the system architecture for the form factor of the computing system. It is planned that the wireless communication, or communication bus 345, will be placed on a mini PCI card or similar. Along with the wireless communication device 345 the PDA system 340 will also reside on the mini PCI card. LPC bus 310 connects to the system motherboard. A mini PCI interface bus 300 will connect the mini PCI card, in particular the wireless communication device 345, to the south bridge controller of the PC system. The PC system is expected to reside on the system motherboard. The PC system includes the south bridge controller 110, north bridge controller 105, and the CPU 100. The south bridge control 110 is connected to the north bridge controller 140 by a PCI bus 140. North bridge control, in turn, is connected to the CPU 100 by a PCI bus 135. The quick switch 320 and the SIO 325 may or may not reside on the system motherboard. IO devices such as the mouse 335 and the keyboard 330 connect to the system by the LPC bus 310.

Although the present disclosure has been described in connection with several embodiments, the disclosure is not intended to be limited to the specific forms set forth herein, but on the contrary, it is intended to cover such alternatives, modifications, and equivalents as can be reasonably included with in the spirit and scope of the disclosure as defined by the appended claims.

What is claimed is:

1. A mobile computing system comprising:
   a personal computer architecture system (PC);
   a personal digital assistant architecture system (PDA);
   a communication device coupled to the PC by a first bus and coupled to the PDA by a second bus; and
   a switch coupled to the PC by a third bus and coupled to the PDA by the second bus, such that control of the mobile computing system is isolated to the PDA when the switch is in a first state and control of the mobile computing system is taken by the PC when the switch is in a second state, the communication device being continuously coupled to the PC and the PDA.

2. The mobile computing system of claim 1 including a set of peripheral devices selectively controllable by either the PC or the PDA system.

3. The mobile computing system of claim 2, wherein the PC interfaces to the communication device and the set of peripheral devices when the PC is active and the switch is in the second state, and the PDA interfaces to the communication device and the set of peripheral devices when the switch is in the first state.

4. The mobile computing system of claim 3 wherein the PDA is a slave device and the PC is a master device.

5. The mobile computing system of claim 3 wherein the second bus and the third bus are low pin count (LPC) busses.

6. The mobile computing system of claim 1 wherein the PDA is a slave device and the PC is a master device.

7. The mobile computing system of claim 1 wherein the second bus and the third bus are low pin count (LPC) busses.

8. The mobile computing system of claim 1 wherein the PDA is integrated into a mini PCI card.

9. The mobile computing system of claim 1 wherein the PDA is integrated into a PC system board.

10. The mobile computing system of claim 1 wherein the PDA and the communication device are integrated into a mini PCI card.

11. The mobile computing system of claim 1 wherein the PDA and the communication device are integrated into a PC system board.

12. A method of providing communication access in a mobile computer system comprising:

providing a personal computer (PC);

providing a personal digital assistant (PDA);

providing a communication device coupled to the PC by a first bus and coupled to the PDA by a second bus; and providing a switch coupled the PC by a third bus and to the PDA by the second bus, such that control of the mobile computer system is isolated to the PDA when the switch is in a first state and control of the mobile computer system is taken by the PC when the switch is in a second state, the communication device being continuously coupled to the PC and the PDA.

13. The method of claim 12 further comprising:

providing information from the PDA to the PC when the PC is active.

14. The method of claim 12 wherein the communication device is a wireless communication technology device.

15. A mobile computing system comprising:

a first computing system exhibiting a first architecture;

a second computing system exhibiting a second architecture that is different from the first architecture;

a communication device coupled to the first computing system by a first bus and coupled to the second computing system by a second bus; and a switch coupled to the first computing system by a third bus and coupled to the second computing system by the second bus, such that control of the mobile computing system is isolated to the second computing system when the switch is in a first state and control of the mobile computing system is taken by the first computing system when the switch is in a second state, the communication device being continuously coupled to the first computing system and the second computing system.

16. The mobile computing system of claim 1 wherein the first state corresponds to the switch being open and the second state corresponds to the switch being closed.

* * * * *